United States Patent [19]

Cuba et al.

[11] Patent Number: 4,620,575
[45] Date of Patent: Nov. 4, 1986

[54] SPEED CONTROL FOR LAWN AND GARDEN VEHICLE

[75] Inventors: Ronald R. Cuba, Plymouth; Richard C. Heidner, West Bend; Clyde R. Wetor, Cascade; Bruce H. Fiedler, Plymouth, all of Wis.

[73] Assignee: Gilson Brothers, Plymouth, Wis.

[21] Appl. No.: 700,472

[22] Filed: Feb. 11, 1985

[51] Int. Cl.⁴ .................................... B60K 17/00
[52] U.S. Cl. ........................... 180/307; 180/336; 74/481; 74/482; 192/3 T; 192/3 G; 192/3 M; 192/4 C
[58] Field of Search ............ 180/271, 307, 335, 336; 74/481, 482, 474; 192/3 T, 3 G, 3 M, 4 C

[56] References Cited

U.S. PATENT DOCUMENTS

| | | | |
|---|---|---|---|
| 3,354,981 | 11/1967 | Swanson et al. | 74/481 |
| 4,059,025 | 11/1977 | Waack et al. | 74/482 |
| 4,301,901 | 11/1981 | Gastos et al. | 74/481 |
| 4,438,835 | 3/1984 | Dowden et al. | 192/3 M |

Primary Examiner—John J. Love
Assistant Examiner—Richard M. Camby

[57] ABSTRACT

A control arrangement for a lawn and garden vehicle having a manually movable member provided for controlling the speed of operation of the tractor and a speed setting arrangement for permitting the operator to manually set a speed control at a minimum constant speed while also permitting the operator to move the manually movable member to temporarily increase the speed of the vehicle. The speed setting arrangement is connected to the lawn tractor brake to cause disengagement of the speed setting apparatus when the brake is applied.

37 Claims, 12 Drawing Figures

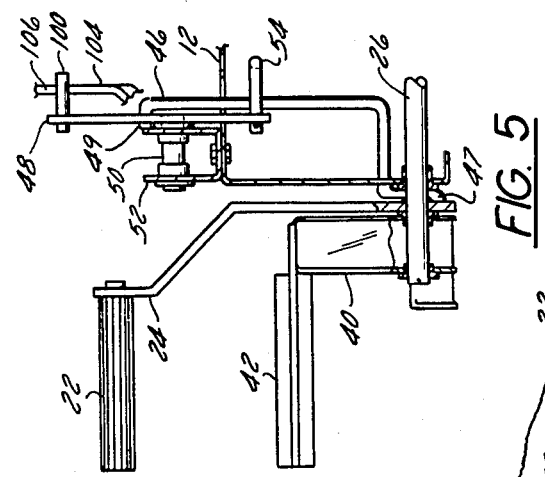
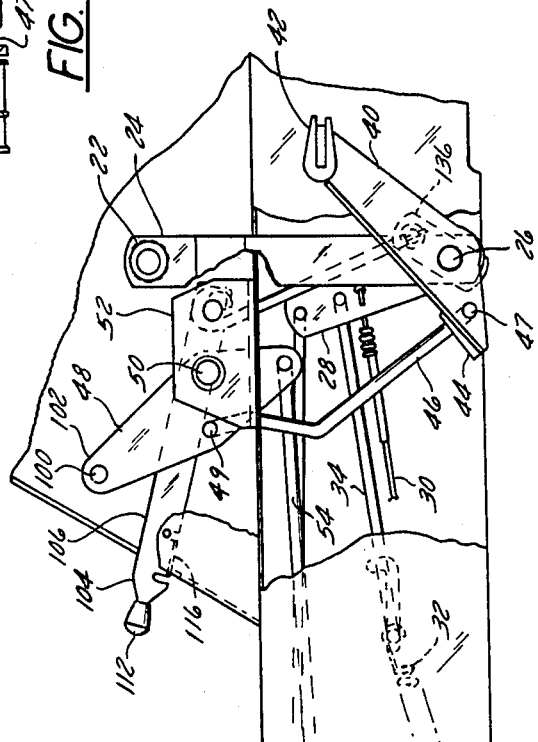
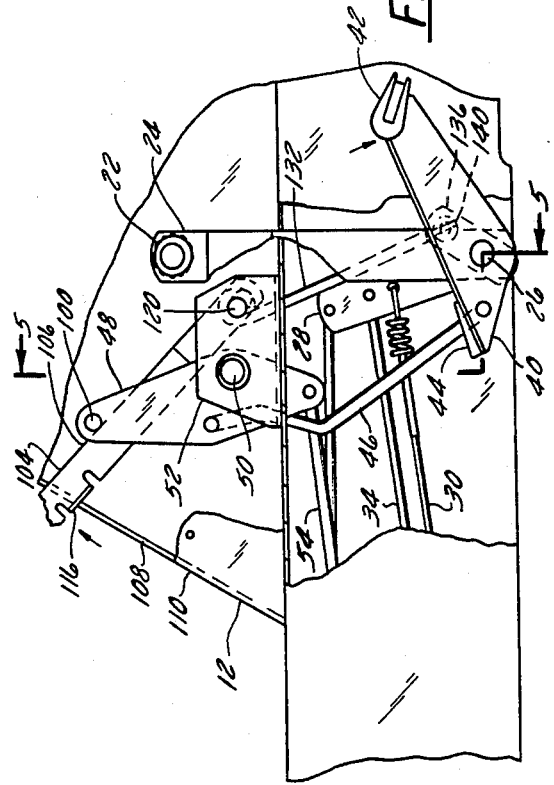
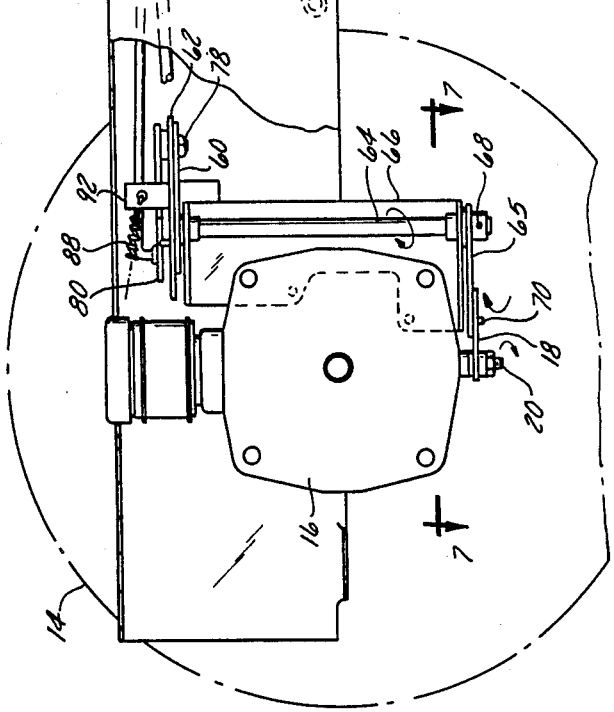

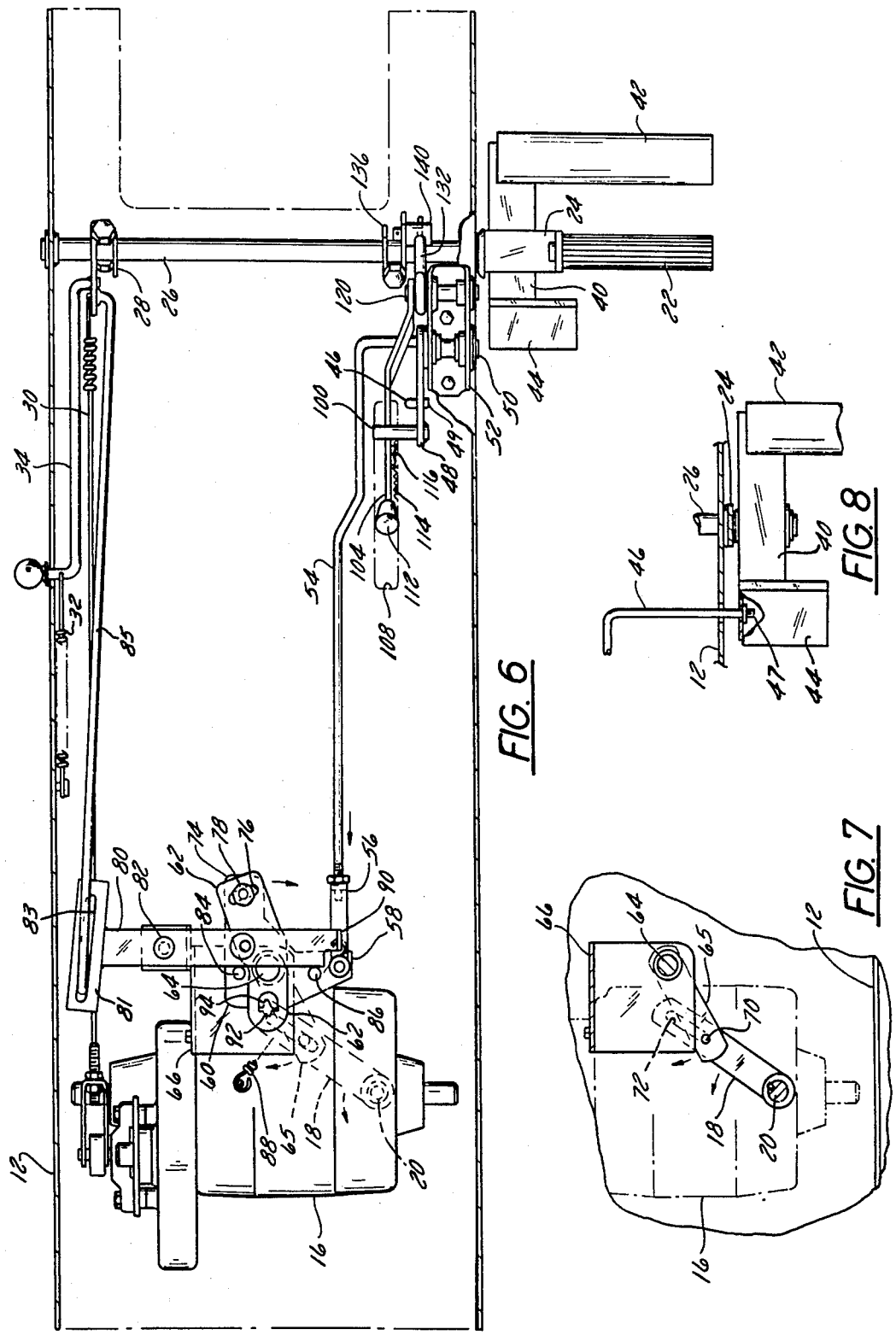

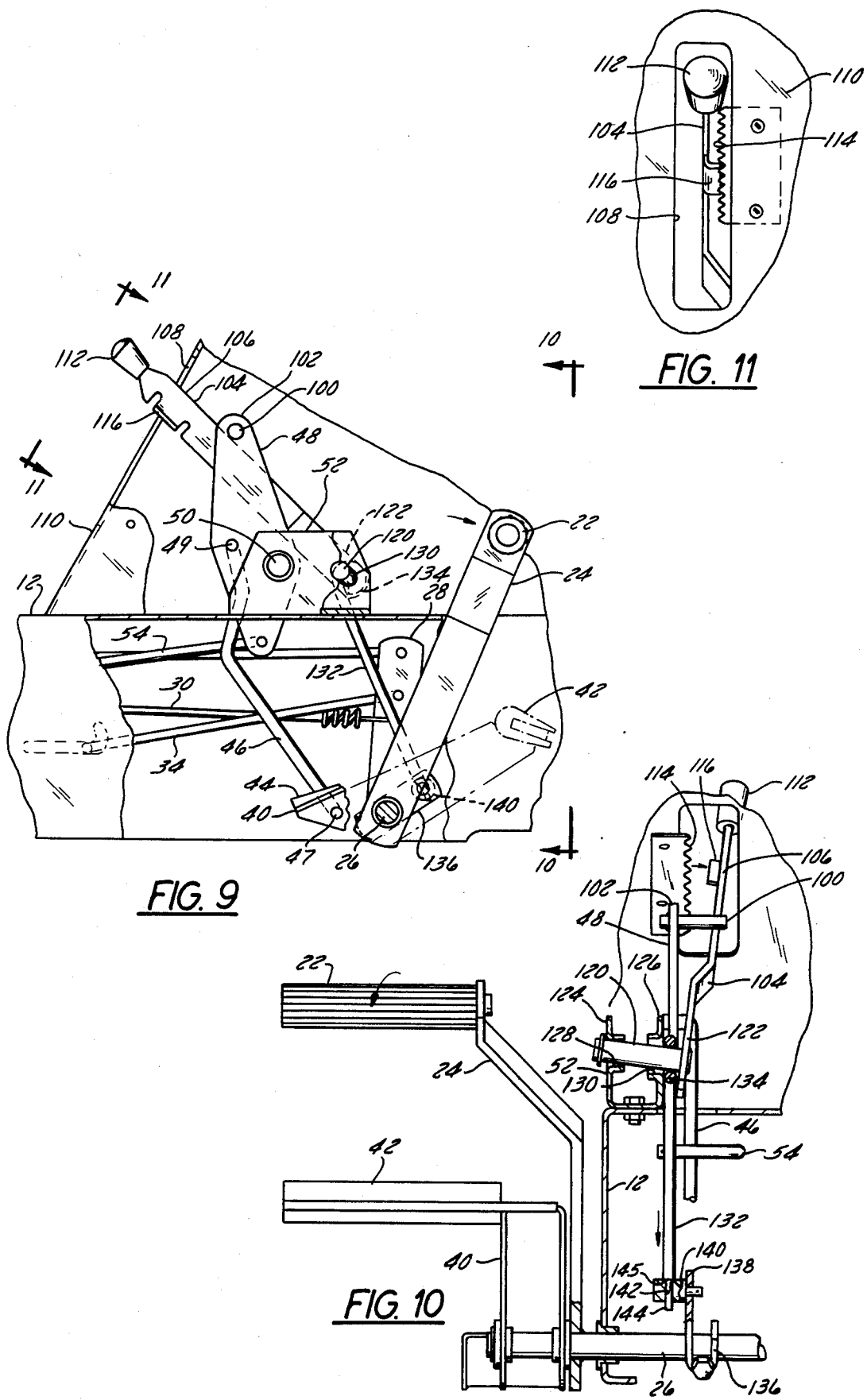

SPEED CONTROL FOR LAWN AND GARDEN VEHICLE

FIELD OF THE INVENTION

The invention relates to lawn and garden vehicles and other similar vehicles and more particularly to speed controls and means for maintaining the speed of a vehicle at a selected minimum speed.

BACKGROUND PRIOR ART

Lawn and garden vehicles such as riding lawn mowers, lawn tractors, garden tractors and other similar vehicles commonly include a hydrostatic transmission, and a foot pedal or control lever is provided for controlling the speed of operation of the vehicle. In most such constructions the operator must maintain a constant uniform pressure on the pedal if the vehicle is to move at a consistent speed. In such vehicles the force which the operator must apply on the foot pedal may be substantial when the vehicle is operated under high drawbar load conditions such as during plowing or towing a trailer or loaded grass catcher etc. Maintaining a constant force on the foot pedal may become very tiring to the operator.

Some prior art constructions have used speed control assemblies where there is sufficient friction in the control assemblies to maintain a control level or foot pedal in position even under high drawbar load conditions. These prior art structures have the disadvantage of requiring substantial force to change travel speed.

Other prior art constructions have employed electric clutch arrangements which can be energized to apply friction drag to the control mechanism to maintain constant travel speed. During operation of a lawn and garden vehicle, it is commonly desireable that the speed of the vehicle be set at a constant speed, such as for plowing. At the end of a row, the operator lifts the plow and then accelerates while turning the vehicle. The speed control arrangement should permit the operator to establish a proper minimum speed, e.g. for plowing, then permit the operator to accelerate, and then return to the original speed setting. In the prior art apparatus employing an electric clutch, the operator must apply a substantial force on the foot pedal to override the speed control when the electric clutch is engaged. When the operator overrides the electric clutch, he sets the control at a new speed setting. Those constructions do not permit the operator to then return to the original minimum speed setting by merely releasing the speed control. In order to return to the original selected speed with vehicles including an electric clutch, the operator must again apply a substantial force to the speed control lever or pedal to once again set the speed.

SUMMARY OF THE INVENTION

The present invention provides a control arrangement for a lawn and garden vehicle and the like wherein a foot pedal is provided for controlling the travel speed of the vehicle, and a speed setting arrangement is provided for permitting the operator to manually engage a means for maintaining a minimum travel speed. The speed setting arrangement also permits the operator to momentarily increase the speed of the vehicle by depressing the foot pedal or a control lever, and then when the foot pedal or control lever is released, the speed of the vehicle will return to the selected speed. The speed setting arrangement is also connected to the vehicle brake arrangement to cause disengagement of the speed setting means whenever the brake is applied.

In a preferred form of the invention the lawn and garden vehicle will include a hydrostatic transmission and a speed and direction control member connected to the hydrostatic transmission so as to control the speed and direction of the output of the transmission. The speed and direction control member is mounted on a pivot shaft for rocking movement from a neutral position to a forward position wherein the transmission drives the vehicle forwardly and from the neutral position to a rearward position wherein the vehicle is driven rearwardly. The extent of the forward or rearward movement of the speed and direction control member varies the speed of the vehicle. A linkage connects the speed and direction control member to the hydrostatic transmission and a pivotal speed control lever is provided for causing movement of the linkage. Means are further provided for setting the minimum speed, this means including a minimum speed setting lever movable by the operator and engageable with the pivotal speed control lever so as to selectively support the pivotal speed control lever in a selected position wherein the vehicle will be driven at a selected minimum speed. The minimum speed setting lever permits the pivotal speed control lever to move freely to a position wherein the speed of the vehicle is increased relative to the minimum speed, but prevents the pivotal speed control lever from moving past the selected minimum speed position to a neutral position. Means are also provided for causing the minimum speed setting lever to release the pivotal speed control lever when the lawn tractor brake is engaged.

A detent means is provided for releasably supporting the minimum speed setting lever in one of a plurality of selected positions when the minimum speed setting lever is in engagement with the detent means.

The minimum speed setting lever is supported for pivotal movement in a first direction toward and away from engagement with the pivotal speed control lever and in a second direction toward and away from the detent means.

Various other features and advantages of the invention will be apparent by reference to the following description of the preferred embodiment, from the claims and from the drawings.

BRIEF DESCRIPTION OF THE DRAWINGS

FIG. 3 is a partial side elevation view of a speed control apparatus of the lawn and garden vehicle illustrated in FIGS. 1 and 2.

FIG. 4 is a partial view of the apparatus illustrated in FIG. 3.

FIG. 5 is an end elevation cross section view taken generally along line 5—5 in FIG. 4.

FIG. 6 is a cross section plan view of the apparatus illustrated in FIG. 3.

FIG. 7 is a bottom plan view taken generally along line 7—7 in FIG. 3.

FIG. 8 is a partial plan view of apparatus illustrated in FIG. 3.

FIG. 9 is an enlarged view of apparatus illustrated in FIGS. 3 and 4.

FIG. 10 is a view taken along line 10—10 in FIG. 9 and is similar to FIG. 5.

FIG. 11 is a view taken along line 11—11 in FIG. 9.

Figure 1:
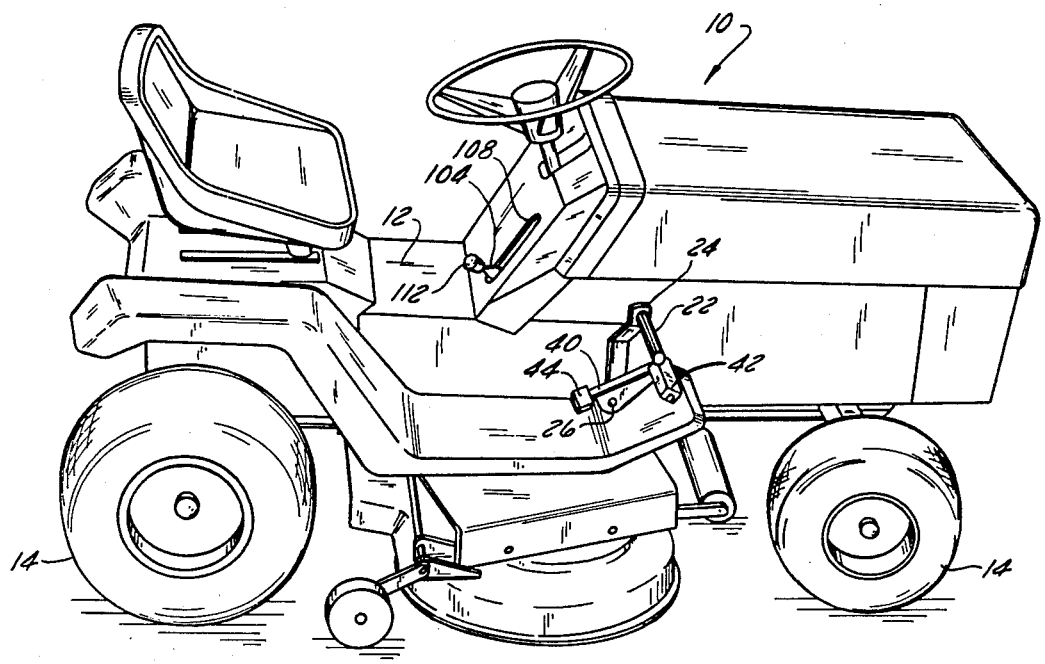
FIGS. 1 and 2 are perspective views of a lawn and graden vehicle embodying the present invention.

Before describing a preferred embodiment of the invention, it is to be understood that the invention is not limited in its application to the details of construction nor to the arrangement of the components set forth in the following description nor illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Figure 2:
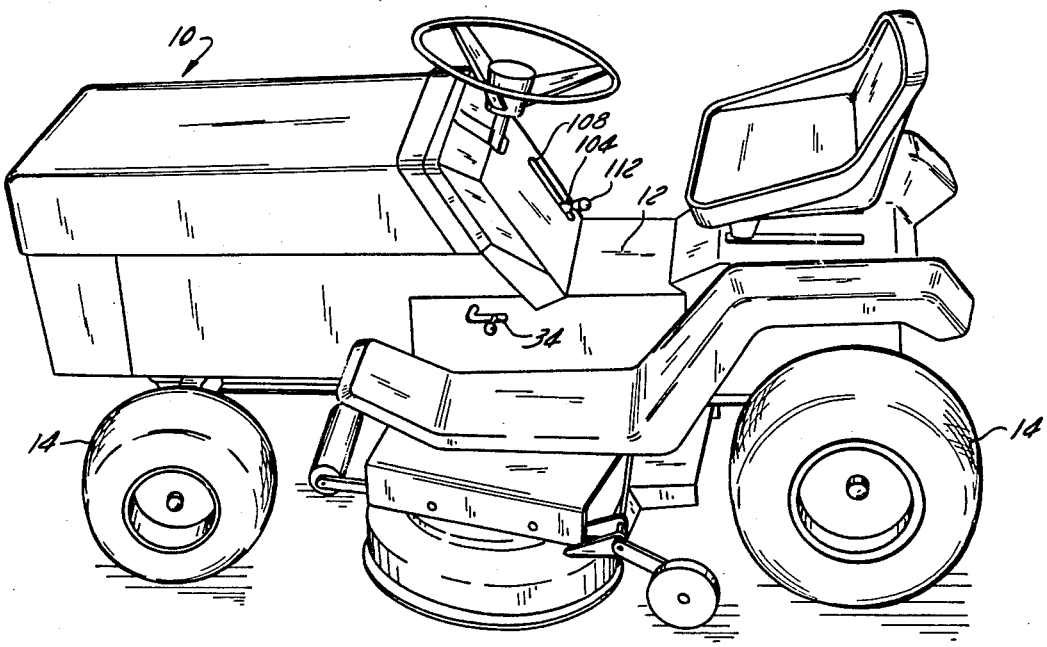

FIGS. 1 and 2 illustrate a lawn and garden vehicle or mower 10 including a frame 12 and having a plurality of wheels 14 supporting the frame 12. The vehicle 10 also includes an engine supported by the frame 12 as well as a transmission 16 (FIG. 3) for drivingly connecting the engine to the wheels. While the transmission 16 of the vehicle 10 could have other constructions, in the illustrated arrangement, the transmission 16 is a hydrostatic transmission and includes a control lever 18 connected to a speed control shaft 20. The transmission control lever 18 is pivotable from a neutral position in a forward direction to cause forward driving movement of the vehicle and from the neutral position to a rearward position to cause rearward driving movement of the vehicle. As the transmission control lever 18 is moved forwardly, the speed of the vehicle 10 is increased proportionately to the amount of movement of the transmission control lever 18 in the forward direction and the degree of movement of the transmission control lever 18 in the rearward direction similarly controls the speed of rearward movement of the vehicle.

The mower or lawn and garden vehicle 10 also includes conventional brakes and a brake pedal 22 for use by the operator in applying the brakes. As illustrated in FIGS. 3 and 6, the brake pedal 22 is supported on the end of a lever arm 24 fixed to a brake shaft 26. The brake shaft 26 is supported by the frame 12 for rotation about a horizontal axis transverse to the center line of the machine frame 12.

Figure 12:
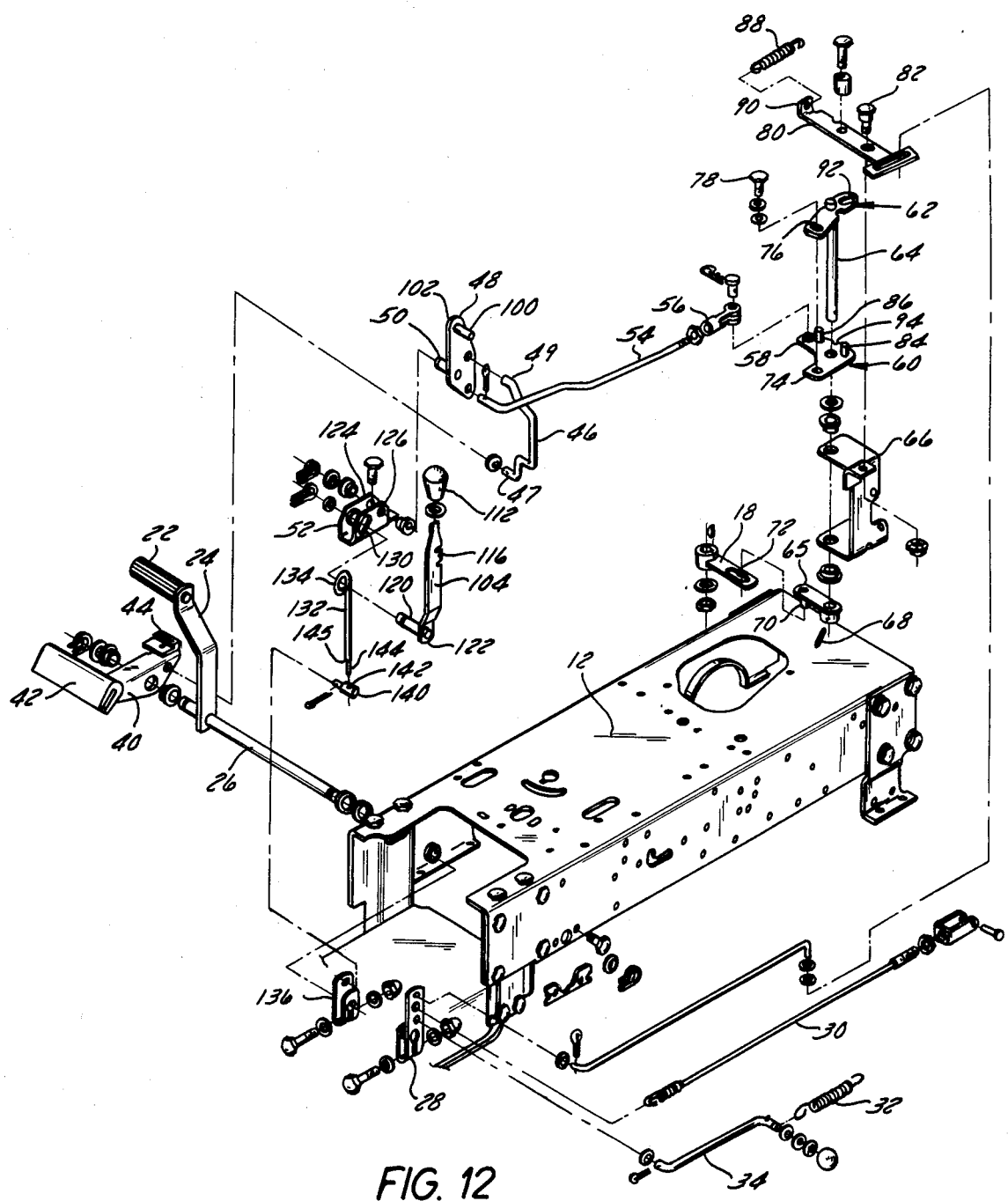
FIG. 12 is an exploded perspective view of the apparatus illustrated in FIGS. 3–11.

In the preferred form of the invention, the brake assembly includes a bracket 28 (FIGS. 6 and 12) fixed to the brake shaft 26 such that it is rotatable with the shaft in response to forward and rearward movement of the brake pedal 22. A cable 30 is connected to an upwardly extending portion of the bracket 28 in spaced relation from the longitudinal axis of the shaft 26, and the cable 30 is connected in a conventional manner to the vehicle brake assembly (not shown) such that when the upper end of the bracket 28 moves forwardly, when the brake pedal 22 is depressed, the cable 30 is pulled forwardly thereby applying the vehicle brakes.

Means are also provided for biasing the bracket 28 to its return position or brake release position. In the illustrated construction, this means for biasing includes a coil spring 32 connected to the machine frame 12, and this spring 32 is connected to the upper end of the bracket 28 by a connecting rod 34. The coil spring 32 applies a rearward biasing force on the upper end of the bracket 28 thereby tending to pull the upper end of the bracket 28 rearwardly and thereby pulling the connected brake pedal 22 to a brake release position.

The vehicle 10 embodying the invention also includes a foot pedal 40. Means are also provided for operably connecting the foot pedal 40 to the transmission control lever 18 such that movement of the foot pedal 40 will cause forward and rearward movement of the vehicle 10 as well as control the speed of the vehicle. In the illustrated arrangement the foot pedal 40 is supported on the end of the brake shaft 26 for rocking movement on the shaft 26 and such that the foot pedal 40 is freely movable with respect to the shaft 26. The foot pedal 40 includes a foot pad 42 mounted on the forward portion of the foot pedal 40 and adapted to be depressed to thereby cause forward motion of the vehicle and a heel pad 44 mounted on a rearward portion of the foot pedal 40 and adapted to be depressed to cause rearward motion of the vehicle 10 and to control the speed of rearward movement of the vehicle. The foot pedal 40 is supported by the brake shaft for rotation about an axis intermediate the foot pad 42 and the heel pad 44 such that pressure on the foot pad 42 causes rotation of the foot pedal 40 in one direction and pressure on the heel pad 44 causes rotation of the foot pedal 40 in an opposite direction. While in the illustrated arrangement of foot pedal 40 is provided for controlling forward and rearward driving movement of the vehicle, in other arrangements a hand operated control lever could also be provided.

Means are also provided for connecting the foot pedal 40 to the transmission control lever 18 such that downward movement of the foot pad 42 causes forward movement of the control lever 18 and consequent forward movement of the vehicle, and downward movement of the heel pad 44 causes rearward movement of the control lever 18 and consequent rearward movement of the vehicle. The means for connecting the foot pedal 40 to the transmission control lever 18 includes a speed control link 46 having one end connected to the foot pedal 40 and an opposite end pivotally connected to a speed control lever 48. The speed control lever 48 is fixed to a shaft 50, and the shaft 50 is in turn supported by a bracket 52 fixed to the vehicle frame 12. The shaft 50 and the speed control lever 48 are supported by the bracket 52 for pivotal movement about a horizontal axis of rotation parallel to the axis of rotation of the foot pedal 40. The one end 47 of the speed control link 46 is connected to the foot pedal 40 in spaced relation from the pivot axis of the foot pedal 40 and the opposite end 49 of the speed control link 46 is connected to the speed control lever 48 at a point spaced from the pivot axis of the lever 48 and such that pivotal movement of the foot pedal 40 causes pivotal movement of the lever 48.

A second speed control link 54 has one end pivotally connected to the speed control lever 48 and an opposite end connected by a clevis 56 (FIG. 3) to a free end of a lever arm 58 of a bellcrank 60. The forward end of the second speed control link 54 is spaced from the pivot axis of the lever 48 such that pivotal movement of the lever 48 causes movement of the second speed control link 54 forwardly or rearwardly and thereby causes pivotal movement of the bellcrank 60 about a vertical axis.

Means are also provided for adjustably connecting the bellcrank 60 to the transmission control lever 18 of the transmission 16 so as to cause movement of the transmission control lever 18 in response to pivotal movement of the bellcrank 60 about the vertical axis. While the means for adjustably connecting the bellcrank 60 to the transmission control lever 18 could have other constructions, in the illustrated arrangement that means includes a lever 62 fixed to the upper end of a shaft 64 for rotation with the shaft 64. The shaft 64 is supported by a bracket 66 in turn fixed to the transmission 16. The bracket 66 includes vertically aligned bores supporting the shaft 64 for free rotation about a vertical axis. The lower end of the shaft 64 supports an end of a pivotable arm 65, and a pin 68 joins the arm to the shaft such that the arm 65 pivots with the vertical shaft 64. The free end of the arm 65 includes a pin 70 housed in a longitudinally extending slot 72 in the transmission control lever 18.

The bellcrank 60 is supported on the vertical shaft 64 for rotation about the vertical pivot axis of the shaft. Means are also provided for adjustably fixing a free end of a second lever arm 74 of the bellcrank 60 to an end of the lever 62 such that pivotal movement of the bellcrank 60 will cause pivotal movement of the lever 62 and pivotal movement of the vertical shaft 64 about its vertical axis. In the illustrated arrangement, the means for adjustably connecting the bellcrank 60 to the lever 62 includes a slot 76 provided in one of either the lever arm 62 mounted on the shaft 64 or the second lever arm 74 of the bellcrank 60. A bolt 78 extends through a bore in the other of the lever 62 and the second lever arm 74 of the bellcrank and through the slot 76, and the slot 76 is constructed to permit adjustable pivotal movement of the bellcrank 60 with respect to the lever 62 about the vertical pivot axis of the shaft 64.

Means are also provided for biasing the bellcrank 60 and the lever 62 toward a position wherein the control lever 18 of the transmission 16 is held in a neutral position. In the particular embodiment of the invention illustrated in the drawings, the means for biasing the bellcrank 60 includes a return bar 80 supported for pivotal movement by a pivot pin 82 about a vertical axis spaced from the pivot axis of the bellcrank 60. This means for biasing also includes a pair of pins 84 and 86 projecting upwardly from the upper planar surface of the bellcrank 60, and the pins 84 and 86 being spaced apart and positioned on opposite sides of the pivot axis of the bellcrank 60. A coil spring 88 has one end fixed to a free end 90 of the return bar 80 and an opposite end fixed to the transmission 16. The coil spring 88 applies a rearward force on the free end 90 of the return bar 80 tending to force an edge of the return bar into engagement with both of the pins 84 and 86.

In the event that the bellcrank 60 is pivoted in a clockwise direction as seen in FIG. 6, the pin 84 will engage the edge of the return bar 80 forcing it to pivot against the force of the spring 88 in a counterclockwise direction about the pivot pin 82. If the bellcrank 60 is pivoted in an opposite direction, the other pin 86 will engage the return bar 80 also forcing it to pivot against the force of the return spring 88. In a preferred form of the invention the coil spring 88 applies a sufficient rearward force on the return bar 80, that when the operator releases the foot pedal, the return bar 80 will apply sufficient force on the pin 84 or 86 that the bellcrank 60 and lever 62 will be returned to a netural position.

In operation of the vehicle 10, the relative position of the bellcrank 60 and lever 62 can be adjusted with respect to one another such that the transmission control lever 18 will be in its precise neutral position when the return bar 80 is in engagement with both of the pins 84 and 86 projecting upwardly from the upper surface of the bellcrank 60 and wherein the bellcrank 60 is in its neutral position. Such adjustment is achieved by loosening the bolt 78 securing the bellcrank 60 to the lever arm 62 such that the lever arm 62 is movable with respect to the bellcrank 60. The foot pedal 40 is released, and the return spring 88 will move the foot pedal 40 to its neutral position. The return spring 88 connected to the return bar 80 will also tend to bias the bellcrank 60 to a neutral position. The lever arm 62 can then be manually adjusted to move the control lever 18 to a position where the transmission 16 will be in neutral. In a common commercially available hydrostatic transmission, the precise neutral position of the transmission control lever 18 may vary from one transmission to the next. In one preferred method of adjustment of the transmission to the neutral position, the vehicle 10 is supported such that the rear wheels 14 can rotate freely, and while the engine is operating, the lever 62 can be manually adjusted relative to the bellcrank 60 so as to cause the transmission control lever 18 to be moved to a position wherein the drive wheels are not driven either forwardly or rearwardly.

Means are also provided for permitting convenient manual adjustment of the position of the lever 62 with respect to the position of the bellcrank 60. While this means could have other alternative construction, in the illustrated arrangement this means includes aligned opposed generally V-shaped notches 92 and 94 one being provided in the adjustable lever 62 and a second being provided in the bellcrank 60. These notches 92 and 94 are adapted to house the blade of a screwdriver or other similar tool, with one edge of the screwdriver blade housed in one of the V-shaped notches 92 and with an opposite edge of the blade housed in the other of the V-shaped notches 94 and in such a manner that twisting movement of the screwdriver about its longitudinal axis will cause adjustable movement of the lever 62 with respect to the bellcrank 60. The screwdriver can be twisted so as to cause pivotal movement of the lever 62 in either a clockwise or counterclockwise direction as is required to position the control lever 18 in a true neutral position. Once the lever 62 is properly adjusted, the bolt 78 can be tightened to thereby secure the bellcrank 60 and lever 62 together in fixed relation.

In the illustrated arrangement, means are also provided for positively causing the return bar 80 to force the bellcrank 60 and the lever 62 to a neutral position when the brake 22 is applied and to thereby insure that the transmission 16 is shifted to neutral when the brake applied. As best shown in FIG. 6, one end of the return bar 80 includes a transverse portion 81 including an elongated slot 83 generally parallel to the longitudinal axis of the vehicle. An elongated rod 85 has one end connected to an upwardly extending end of the bracket 28 and an opposite end of the elongated rod includes a hook portion housed in the elongated slot 83.

During operation of the vehicle 10, the return bar 80 can pivot about the pivot pin 82, and the hook portion at the end of the connecting rod 85 will move freely in the slot 83. In the event the brake 22 is depressed, the hook portion can move forwardly and engage a forward end of the slot 83 ensuring pivotal movement of the return bar 80 to the position wherein the bellcrank 60 and the lever 62 are forced to the neutral position.

While in the illustrated arrangement the bellcrank 60 and the lever 62 are shown as being mounted above the transmission, it will be understood by those skilled in the art that the bellcrank 60 and lever 62 could be mounted below the transmission and with the lever 62 connected directly to the transmission speed and direction control shaft 20. In such a construction the bellcrank 60 can be supported for pivotal movement around the longitudinal axis of the shaft 20. The return bar would also be mounted below the vehicle transmission.

As described above, the foot pad 42 is depressed by the operator to cause forward driving movement of the vehicle 10, and the foot pedal 40 also controls the speed of the vehicle. Means are also provided by the present invention for releasably maintaining the vehicle 10 at a minimum selected speed. As also described above, the vehicle further includes a brake pedal 22 which can be depressed by the operator to brake the vehicle. In a preferred form of the invention the means for releaseably maintaining the vehicle at the minimum selected speed is connected to the brake assembly and is disengaged whenever the brake pedal 22 is depressed.

The means for maintaining the speed of the vehicle at a minimum selected speed includes a pin 100 (FIGS. 3 and 5) which projects from an upwardly extending end 102 of the speed control lever 48. As previously stated, the speed control lever 48 is supported for pivotal movement about a horizontal axis by a pivot pin 50. The pin 50 is housed in aligned bores of a bracket 52 and is supported therein for relatively free rotation about its longitudinal axis. In operation of the foot pedal 40, when the foot pad 42 is depressed, the link 46 causes the speed control speed control lever 48 to pivot on the pivot pin 50 and such pivotal movement of the speed control lever 48 causes consequent movement of the linkage 54. Such pivotal movement of the lever 48 also causes generally upward movement of the stop or pin 100 as the foot pad 42 is depressed.

Means are also provided for releaseably supporting or engaging the pin 100 to support the speed control lever 48 in the position established by depressing the foot pad 42 and to thereby prevent the speed of the vehicle from decreasing. In the illustrated construction that means includes a minimum speed setting lever 104 having a upper edge 106 adapted to engage the pin or stop 100 to support the pin 100 such that the speed control lever 48 cannot move toward the neutral position. The minimum speed setting lever 104 is housed in a longitudinal slot 108 provided in the control panel 110 of the lawn tractor 10, and an upper end of the minimum speed setting lever 104 projects rearwardly and upwardly through the slot 108 in the control panel 110 and includes a knob 112 adapted to permit the operator to adjust the position of the minimum speed setting lever 104. In the illustrated arrangement one edge or side of the slot 108 in the control panel 110 is provided with a plurality of serrations 114 (FIG. 11) extending along its length. The minimum speed setting lever 104 includes one portion 116 which is bent toward the serrations 114, and that portion of the minimum speed setting lever 104 includes an edge shaped so as to fit or be housed in individual ones of the serrations 114 and to prevent sliding movement of the minimum speed setting lever 104 along the length of the slot 108. In a preferred form of the invention the slot 108 has a width greater than the thickness of the minimum speed setting lever 104 and such that the lever 104 can be moved toward and away from the serrations 114.

Means are also provided for supporting the minimum speed setting lever 104 for pivotal movement such that it can move along the length of the slot 108 provided in the control panel toward and away from the pin 100. The means for supporting the minimum speed setting lever 104 also supports it such that the portion of the minimum speed setting lever housed in the slot 108 can move generally perpendicularly to the length of the slot and toward and away from the serrated edge 114. Referring more particularly to the means for supporting the minimum speed setting lever 104, in the illustrated construction, a pin 120 is rigidly fixed to the lower end 122 of the minimum speed setting lever (FIG. 10) and provides support for the minimum speed setting lever 104. The bracket 52 includes a pair of spaced apart upwardly extending sidewalls 124 and 126. Side wall 124 includes a bore 128 housing the free end of the pin 120, and a slot 130 houses a portion of the pin 120 adjacent the minimum speed setting lever 104. The bore 128 is slightly larger than the diameter of the pin 120 and the slot 130 permits generally vertical movement of an end of the pin 120. Such vertical movement of that end of the pin 120 permits the end of the minimum speed setting lever in the slot 108 to move toward and away from serrations 114.

Means are also provided for selectively applying an upward force on the pin 120 supporting the minimum speed setting lever 104 so as to bias it toward a position wherein the serration engaging portion 116 of the minimum speed setting lever 104 will engage the serrations 114 and prevent movement of the minimum speed setting lever 104 along the length of the slot 108. While various means could be provided for applying this biasing force on the pin 120 and the speed setting lever 104, in the arrangement illustrated, that means includes a link 132 having an upper end 134 surrounding the pin 120 adjacent the minimum speed setting lever 104. A bracket 136 is fixed to the brake shaft 26 for rotation with the brake shaft 26. The bracket 136 includes a portion 138 extending upwardly away from the brake shaft 26 and this portion 138 includes a bore housing a small diameter end of a bullpin 140. The bullpin 140 includes a larger diameter portion having a smooth bore 142 extending diametrically therethrough. The smooth bore 142 is adapted to slideably house a small diameter lower end portion 144 of the link 132.

As previously described, the spring 32 is connected to the upwardly extending end of the bracket 28 by a connecting rod 34 and biases the brake shaft 26 in a counter clockwise direction as seen in FIGS. 3 and 9 and toward a brake release position. This spring force on the brake shaft 26 also causes the bullpin 140 to apply a generally upward force on the shoulder 145 of the link 132. The link 132 in turn applies an upward biasing force on the end of the pin 120 supporting the speed setting lever 104. This force on the pin 120 biases the serration engaging portion 116 of the minimum speed setting lever 104 into engagement with the serrated edge 114 of the slot 108.

If the brake pedal 22 is depressed, the brackets 28 and 136 will rotate in a clockwise direction as seen in FIGS. 3 and 9, and the bullpin 140 can move downwardly with respect to the pin 132 thereby relieving the upward force on the pin 132. When the upward biasing force on the pins 132 and 120 is removed, the weight of the minimum speed setting lever 104 will cause the pin 120 to fall to the position shown in FIG. 10, and the portion 116 of lever 104 will move away from the serrated side 116 of the slot 108. Once the engaging portion 116 moves away from the serrations 114, the weight of the upper end of the lever 104 will cause the lever 104 to fall to the bottom of the slot 108 (FIG. 3). Once the minimum speed setting lever 104 releases the pin 100, the speed control lever 48 is then free to pivot about the axis of the pivot pin 50 and the speed control lever 48 is free to return to its neutral position.

In operation of the speed setting assembly, once the minimum speed setting lever 104 has been moved into engagement with the pin 100 to hold the speed control lever 48 in a position where the vehicle will be driven at a selected speed, the operator can depress the foot pad 42 to cause the speed of the vehicle to increase. The force of the brake assembly on the minimum speed setting lever 104 will cause the speed setting lever 104 to remain in engagement with the serrations 114. If the operator then releases the foot pad 42, the lever 48 will return to a position wherein the pin 100 will once again engage the minimum speed setting lever, and the vehicle will slow to the selected speed.

Various features of the invention are set forth in the following claims.

We claim:

1. A lawn and garden vehicle comprising
a frame,
wheels supporting the frame for movement along the ground,
brake means for braking the vehicle, said brake means including a brake member supported for movement between a brake release position and a brake engaging position,
an engine supported by the frame,
a transmission for drivingly connecting the engine to the wheels,
means for controlling the operation of the transmission to thereby control the direction of movement of the lawn and garden vehicle and the speed of movement of the lawn and garden vehicle, the means for controlling operation of the transmission including
a manually movable control member supported for movement from a neutral position to a forward driving position and from said neutral position to a rearward driving position,
means for operably connecting said manually movable control member to said transmission to control operation of said transmission in response to movement of said manually movable control member, said means for operably connecting including a speed control member connected to said manually movable control member for movement from a neutral position to a forward drive position in response to movement of said manually movable control member from said neutral position to said forward drive position, and
means for selectively and releaseably supporting said speed control member in a selected minimum speed position, said means for selectively and releaseably supporting said speed control member supporting said speed control member such that said speed control member is prevented from moving from said selected minimum speed position toward said neutral position when said means for selectively and releaseably supporting supports said speed control member, and such that said speed control member is freely movable from said minimum speed position to an increased speed position, and said means for selectively and releaseably supporting including means for releasing said speed control member when said brake member is moved toward said brake engaging position.

2. A lawn and garden vehicle as set forth in claim 1 wherein said means for selectively and releaseably supporting includes a speed setting lever for engaging said speed control member, and means for causing said speed setting lever to releaseably maintain its engagement with said speed control member when said brake member is in said brake release position.

3. A lawn and garden vehicle as set forth in claim 2 and further including a control panel, said control panel having a slot housing a portion of said speed setting lever and said portion of said speed setting lever being supported for movement along the length of said slot.

4. A lawn and garden vehicle as set forth in claim 3 wherein said speed setting lever includes opposite ends and wherein said means for selectively and releaseably supporting includes means for supporting one of said opposite ends of said speed setting lever for pivotal movement about a first pivot axis wherein said portion of said speed setting lever moves along the length of said slot in said control panel, and means for supporting said portion of said speed setting lever for movement in a direction transverse to said first pivot axis between a locking position and a release position.

5. A lawn and graden vehicle as set forth in claim 4 wherein said means for supporting said speed setting lever includes a pin, said pin having opposite ends, one of said ends of said pin being fixed to said one of said opposite ends of said speed setting lever and the other of said ends of said pin extending away from said speed setting lever such that said pin extends transversely to said speed setting lever, and means for supporting said pin such that said speed setting lever is pivotable about the longitudinal axis of said speed setting lever and such that said one of said ends of said pin is shiftably movable in a direction transverse to said longitudinal axis of said pin between a position wherein said speed setting lever is in a speed setting position and a release position.

6. A lawn and garden vehicle as set forth in claim 2 and further including means for supporting said speed setting lever for movement in a first direction toward and away from said speed control member, and wherein said means for selectively and releaseably supporting includes means for releasably restraining said speed setting lever from movement in said first direction toward and away from said speed control member, said speed setting lever being supported for movement in a direction transverse to said first direction and between a first position wherein said speed setting lever engages said means for releaseably restraining, and a second position wherein said speed setting lever is spaced from said means for releaseably restraining whereby said speed setting lever is movable in said first direction.

7. A lawn and garden vehicle as set forth in claim 6 and further including means for resiliently biasing said speed setting lever toward said first position when said brake member is in said brake release position, said means for resiliently biasing releasing said speed locking lever when said brake member is moved to said brake engaging position.

8. A lawn and garden vehicle as set forth in claim 7 wherein said means for supporting said speed setting lever includes a pin having opposite ends, one of said opposite ends being fixed to said speed setting lever, and means for supporting said pin for rotation about its longitudinal axis whereby said speed setting lever moves in said first direction, and said means for supporting said pin including means for supporting said one of said ends of said pin for shiftable movement in a direction transverse to the longitudinal axis of said pin whereby said speed setting lever can move toward and away from said means for releasably restraining.

9. A lawn and garden vehicle as set forth in claim 8 wherein said means for supporting said pin includes a bracket member, a first portion of said bracket member including a first aperture housing an opposite end of said pin and a second portion of said bracket member including a second aperture housing said one of said ends of said pin, said second aperture supporting said one of said ends of said pin for movement in a direction transverse to the longitudinal axis of said pin.

10. A lawn and garden vehicle as set forth in claim 9 wherein said means for resiliently biasing said speed setting lever toward said position wherein said speed setting lever engages said means for releaseably restraining includes means for selectively applying an upward resilient force on said one of said ends of said pin, said means for selectively applying an upward resilient force including means connected to said brake member.

11. A lawn and garden vehicle as set forth in claim 1 wherein said brake means further includes spring means for biasing said brake pedal toward said brake release position, and wherein said means for selectively and releaseably supporting includes means for engaging said speed control member to maintain said speed control lever in said selected position and means for connecting said spring means to said means for engaging to selectively and releaseably hold said means for engaging against said speed control member.

12. A vehicle comprising a frame,
wheels for supporting the frame for movement along the ground,
an engine,
means for operably connecting the engine to the wheels to drive the wheels, said means for operably connecting including a transmission,
means for controlling operation of the transmission including a speed control member operably connected to said transmission, said speed control member being pivotally movable about a pivot axis from a neutral position in a first direction to a forward driving position to cause forward driving movement of the vehicle, and from said neutral position in an opposite pivotal direction to cause rearward driving movement of the vehicle,
brake means for selectively braking the vehicle, said brake means including a movable brake member adapted to be selectively moved by the operator from a brake release position to a brake engaging position, and
means for selectively engaging said speed control member to support said speed control member in a forward driving position, said means for selectively engaging including means for selectively supporting said speed control member such that said speed control member is prevented from moving from said forward driving position toward said neutral position, and such that said speed control member is freely movable from said minimum speed position to an increased speed position, and said means for selectively engaging including means for releasing said speed control member when said movable brake member is moved from said brake release position toward said brake engaging position.

13. A vehicle as set forth in claim 12 wherein said means for selectively and releaseably engaging includes a speed setting lever for engaging said speed control member, and means for causing said speed setting lever to releaseably maintain its engagement with the speed control member when said brake member is in said brake release position.

14. A vehicle as set forth in claim 13 and further including a control panel, said control panel having a slot housing a portion of said speed setting lever and supporting said portion of said speed setting lever for movement along the length of said slot.

15. A vehicle as set forth in claim 14 wherein said speed setting lever includes opposite ends and wherein said means for selectively and releaseably engaging includes means for supporting one of said opposite ends of said speed setting lever for pivotal movement about a first pivot axis wherein said portion of said speed setting lever moves along the length of said slot in said control panel, and said means for supporting said portion of said speed setting lever for movement in the direction of said first pivot axis between a locking position and a release position.

16. A vehicle as set forth in claim 13 wherein said means for supporting said speed setting lever includes a pin, said pin having opposite ends, one of said ends being fixed to said one of said opposite ends of said speed setting lever and the other of said ends extending away from said speed setting lever such that said pin extends transversely to said speed setting lever, and means for supporting said pin such that said speed setting lever is pivotable about the longitudinal axis of said speed setting lever and such that said one of said ends of said pin is movable in a direction transverse to said longitudinal axis of said pin between a position wherein said speed setting lever is in a speed locking position and a release position.

17. A vehicle as set forth in claim 14 wherein said means for selectively and releaseably engaging further includes means for selectively and resiliently maintaining said portion of said speed setting lever in said locking position.

18. A vehicle as set forth in claim 13 wherein said speed setting lever is supported for movement in a first direction toward and away from said speed control member, and wherein said means for selectively and releaseably engaging includes means for releaseably restraining said speed setting lever from movement in said first direction toward and away from said speed control member, said speed setting lever being supporting for movement in a direction transverse to said first direction and between a first position wherein said speed setting lever engages said means for releaseably restraining, and a second position wherein said speed setting lever is spaced from said means for releaseably restraining whereby said speed setting lever is movable in said first direction.

19. A vehicle as set forth in claim 18 and further including means for resiliently biasing said speed setting lever toward said first position when the brakes are in a brake release position, and means for resiliently biasing releasing said speed setting lever when said movable brake member is moved to said brake engaging position.

20. A vehicle as set forth in claim 19 wherein said means for supporting said speed setting lever includes a pin having opposite ends, one of said opposite ends being fixed to said speed setting lever, and means for supporting said pin for rotation about its longitudinal axis whereby said speed setting lever moves in said first direction, and said means for supporting said pin including means for supporting said one of said ends of said pin for movement in a direction transverse to the longitudinal axis of said pin whereby said speed setting lever can move toward and away from said means for releaseably restraining.

21. A vehicle as set forth in claim 20 wherein said means for supporting said pin includes a bracket member, a first portion of said bracket member including a first aperture housing an opposite end of said pin and a second portion of said bracket member including a second aperture housing said one of said ends of said pin, said second aperture supporting said one of said ends of said pin for movement in a direction transverse to the longitudinal axis of said pin.

22. A vehicle as set forth in claim 21 wherein said means for resiliently biasing said speed setting lever toward said position wherein said speed setting lever engages said means for releaseably restraining includes means for selectively applying an upward resilient force on said one of said ends of said pin, said means for selectively applying an upward resilient force including means connected to said brake.

23. A vehicle as set forth in claim 12 wherein said brake means further includes spring means for biasing said brake member toward said brake release position, and wherein said means for selectively and releaseably engaging includes means for engaging said control lever to maintain said control lever in said selected position, and means for connecting said spring means to said means for engaging to selectively and releaseably hold said means for engaging against said speed control lever.

24. Apparatus for use in a lawn and garden vehicle for controlling the speed of the lawn and garden vehicle wherein the lawn and garden vehicle includes a frame, wheels for supporting the frame for movement along the ground, and engine, and a transmission for drivingly connecting the engine to the wheels, a speed and direction control member operably connected to the transmission, the speed and direction control member being movable from a neutral position to a forward drive position and wherein the output speed of the transmission in the forward direction is dependent upon the extent of forward movment of the speed and direction control member, and the speed and direction control member being movable from the neutral position to a rearward drive position wherein the output speed of the transmission in the rearward direction is proportional to the extent of movement of the speed and direction control member from the neutral position toward the rearward position, and brake means for selectively braking the lawn and garden vehicle, the brake means including a movable brake member adapted to be selectively moved from a brake release position to a brake engaging position, and means for resiliently biasing said movable brake member toward the brake release position, the apparatus comprising:
means for selectively and releaseably engaging the speed and direction control member for holding said speed and direction control member in a selected position and preventing movement of the speed and direction control member to the neutral position, said means for selectively and releaseably supporting said speed control member permitting movement of said speed control member to an increased speed position and supporting said speed control member in said selected minimum speed position when said speed control member returns to said selected minimum speed position, and said means for selectively and releaseably engaging including means for releasing said speed and direction control member when said movable brake member is moved toward said brake engaging position.

25. Apparatus as set forth in claim 24 wherein said means for selectively and releaseably engaging includes a speed setting lever for engaging said speed and direction control member, and means for causing said speed setting lever to releaseably maintain its engagement with the speed and direction control member when said brake member is in said brake release position.

26. Apparatus as set forth in claim 25 and further including a control panel, said control panel having a slot housing a portion of said speed setting lever and said portion of said speed setting lever being supported for movement along the length of said slot.

27. Apparatus as set forth in claim 26 wherein said speed setting lever includes opposite ends and wherein said means for selectively and releaseably engaging includes means for supporting one of said opposite ends of said speed setting lever for pivotal movement about a first pivot axis wherein said portion of said speed setting lever moves along the length of said slot in said control panel, and means for supporting said portion of said speed setting lever for movement in a direction transverse to said first pivot axis between an engaging position and a release position.

28. Apparatus as set forth in claim 27 wherein said means for supporting said speed setting lever includes a pin, said pin having opposite ends, one of said ends being fixed to said one of said opposite ends of said speed setting lever and the other of said ends extending away from said speed setting lever such that said pin extends transversely to said speed setting lever, and means for supporting said pin such that said speed setting lever is pivotable about the longitudinal axis of said speed setting lever and such that said one of said ends of said pin is generally reciprocably movable in a direction transverse to said longitudinal axis of said pin between a position wherein said speed setting lever is in a speed locking position and a release position.

29. Apparatus as set forth in claim 26 wherein said means for selectively and releaseably engaging further includes means for selectively resiliently maintaining said portion of said speed setting lever in said engaging position.

30. Apparatus as set forth in claim 25 wherein speed setting lever is supported for movement in a first direction toward and away from said speed control member, and wherein said means for selectively and releaseably engaging includes means for releaseably restraining said speed setting lever from movement in said first direction toward and away from said speed and direction control member said speed setting lever being supported for movement in a direction transverse to said first direction and between a first position wherein said speed setting lever engages said means for releaseably restraining, and a second position wherein said speed setting lever is spaced from said means for releaseably restraining whereby said speed setting lever is movable in said first direction.

31. Apparatus as set forth in claim 30 and further including means for resiliently biasing said speed setting lever toward said first position when said brake member is in a brake release position, and releasing said speed setting lever when said brake member is moved toward the brake engaging position.

32. Apparatus as set forth in claim 31 wherein said means for supporting said speed locking lever includes a pin having opposite ends, one of said opposite ends being fixed to said speed setting lever, and means for supporting said pin for rotation about its longitudinal axis whereby said speed setting lever moves in said first direction, said means for supporting said pin including means for supporting said one of said ends of said pin for movement in a direction transverse to the longitudinal axis of said pin whereby said lever can move toward and away from said means for engaging.

33. Apparatus as set forth in claim 32 wherein said means for supporting said pin includes a bracket member, a first portion of said bracket member including a first aperture housing an opposite end of said pin and a second portion of said bracket member including a second aperture housing said one of said ends of said pin, said second aperture supporting said one of said ends of said pin for movement in a direction transverse to the longitudinal axis of said pin.

34. Apparatus as set forth in claim 33 wherein said means for resiliently biasing said speed setting lever toward said position wherein said speed setting lever engages said means for releaseably restraining includes means for selectively applying an upward resilient force on said one of said ends of said pin, said means for selectively applying an upward resilient force including means connected to said brake.

35. Apparatus as set forth in claim 24 wherein said brake means further includes spring means for biasing said brake pedal toward said brake release position, and wherein said means for selectively and releaseably engaging includes means for engaging said speed and direction control member to maintain said speed and direction control member in said selected position, and means for connecting said spring means to said means for engaging to selectively and releaseably hold said means for engaging against said speed and direction control member.

36. A speed and direction control arrangement for a lawn and garden vehicle including an engine and transmission operably connected to the engine, the control arrangement comprising:
means for controlling the transmission, said means for controlling the transmission travel including a manually operable speed control adapted to be moved to control the speed of the lawn and garden vehicle, and a speed control member responsive to movement of said manually operable speed control,
means for selectively manually maintaining the travel speed of the vehicle at a selected minimum speed, said means for selectively manually maintaining the travel speed of the vehicle at a selected minimum speed including means for providing for movement of said manually operable speed control to an increased speed position and means for holding said speed control member in said selected minimum speed position when said manually operable speed control is released from said increased speed position, and
brake means for selectively braking said vehicle, said brake means being operably connected to said means for holding said speed control member in said selected minimum speed position to cause disengagement of said means for holding said speed control member in said selected minimum speed position when said brake is applied.

37. A control arrangement for controlling the speed of travel of a lawn and garden vehicle having a frame, wheels for supporting the frame for movement along the ground, an engine, a transmission operably connecting the engine to the wheels to drive the wheels, and means for braking the wheels, said means for braking the wheels including a brake pedal, the control arrangement comprising:
a manually operable movable control member operably connected to the transmission for controlling the speed of travel of the vehicle,
means for selectively engaging the manually operable movable control member to releaseably hold said manually operable moveable control member at a selected speed,
means for maintaining engagement of said means for selectively engaging with said manually operable moveable control member when the speed of the vehicle is increased to a speed greater than said minimum speed, said means for maintaining engagement permitting movement of said manually operable movable control member to an increased speed position and supporting said manually operable movable control member in said selected minimum speed position when said manually operable moveable control member returns to said selected minimum speed position, and
means for operably connecting said means for braking to said means for maintaining engagement to cause disengagement of said means for selectively engaging when said brake means is caused to brake said vehicle.

* * * * *